(12) United States Patent
Brennan et al.

(10) Patent No.: US 8,202,612 B2
(45) Date of Patent: Jun. 19, 2012

(54) POLYESTER FILM

(75) Inventors: William J. Brennan, Middlesborough (GB); Stephen William Sankey, North Yorkshire (GB); Mark Russell Hodgson, Middlesborough (GB)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 860 days.

(21) Appl. No.: 12/279,585

(22) PCT Filed: Feb. 14, 2007

(86) PCT No.: PCT/GB2007/000527
§ 371 (c)(1),
(2), (4) Date: Aug. 15, 2008

(87) PCT Pub. No.: WO2007/093798
PCT Pub. Date: Aug. 23, 2007

(65) Prior Publication Data
US 2010/0003377 A1 Jan. 7, 2010

(30) Foreign Application Priority Data
Feb. 17, 2006 (GB) .................................. 0603254.4

(51) Int. Cl.
*B32B 7/12* (2006.01)
*B32B 15/04* (2006.01)

(52) U.S. Cl. ....... 428/348; 428/35.7; 428/343; 428/347; 428/349; 428/480; 264/173.16; 156/244.11; 156/244.23

(58) Field of Classification Search .................. 426/106; 428/35.7, 343, 347, 348, 349, 480; 264/173.16; 156/244.11, 244.23
See application file for complete search history.

(56) References Cited

U.S. PATENT DOCUMENTS

| | | | |
|---|---|---|---|
| 4,333,968 A | 6/1982 | Nahmias | |
| 4,590,125 A | 5/1986 | Balloni et al. | |
| 4,681,803 A * | 7/1987 | Liu | 428/348 |
| 4,699,845 A | 10/1987 | Oikawa et al. | |
| 4,820,536 A | 4/1989 | Lippincott et al. | |
| 5,552,169 A | 9/1996 | Kannankeril et al. | |
| 5,663,030 A | 9/1997 | Malhotra | |
| 5,882,798 A | 3/1999 | Hubbard et al. | |
| 5,888,635 A | 3/1999 | Yang et al. | |
| 5,925,428 A | 7/1999 | Hubbard et al. | |
| 6,623,821 B1 | 9/2003 | Kendig | |
| 6,939,584 B2 | 9/2005 | Sankey et al. | |
| 7,824,749 B2 * | 11/2010 | Dawes | 428/35.7 |
| 2003/0021870 A1 | 1/2003 | Pollok et al. | |
| 2004/0014883 A1 * | 1/2004 | Yamamoto et al. | 524/599 |
| 2004/0067284 A1 * | 4/2004 | Sankey et al. | 426/106 |
| 2004/0213967 A1 | 10/2004 | Peiffer et al. | |
| 2005/0074598 A1 * | 4/2005 | Peiffer et al. | 428/323 |
| 2005/0100729 A1 | 5/2005 | Peiffer et al. | |
| 2005/0100750 A1 | 5/2005 | Peiffer et al. | |

FOREIGN PATENT DOCUMENTS

| | | |
|---|---|---|
| EP | 0111819 A2 | 6/1984 |
| EP | 0289162 A2 | 1/1988 |
| EP | 0349141 A2 | 6/1989 |
| EP | 0408197 A2 | 6/1990 |
| EP | 0429179 A2 | 10/1990 |
| EP | 0504522 | 9/1992 |
| EP | 0576179 A1 | 6/1993 |
| EP | 0563442 | 10/1993 |
| EP | 0581970 | 2/1994 |
| EP | 0680409 | 8/1994 |
| EP | 0680409 | 11/1995 |
| EP | 0696516 | 2/1996 |
| EP | 0712719 | 5/1996 |
| EP | 712719 A1 * | 5/1996 |
| EP | 1444098 B1 * | 3/2006 |
| GB | 1077813 | 6/1965 |
| GB | 1077813 | 8/1967 |
| GB | 2024715 A | 1/1980 |
| GB | 2250408 | 6/1992 |
| GB | 2280342 | 1/1995 |
| JP | 2005066939 | 3/2005 |
| JP | 2005068238 | 3/2005 |
| JP | 2006007745 | 1/2006 |
| JP | 2006007746 | 1/2006 |
| JP | 06134950 | 5/2006 |
| JP | 06316644 | 11/2006 |
| WO | WO 94/16903 | 8/1994 |
| WO | WO 94/25527 | 11/1994 |
| WO | WO 9425527 | 11/1994 |
| WO | WO 96/19333 | 6/1996 |
| WO | WO 97/37849 | 10/1997 |
| WO | WO 02/26493 | 4/2002 |
| WO | WO 03/026892 | 4/2003 |
| WO | WO 03/061957 | 7/2003 |
| WO | WO 2007/093798 A1 | 8/2007 |
| WO | WO 2007093798 | 8/2007 |

OTHER PUBLICATIONS

Ibarrola O. Torres; "International Search Report"; Jun. 6, 2007; 3 pp; European Patent Office; Rijswijk, The Netherlands.

* cited by examiner

*Primary Examiner* — Michael C Miggins
(74) *Attorney, Agent, or Firm* — RatnerPrestia

(57) ABSTRACT

A heat-sealable, peelable, coextruded composite polymeric film comprising a substrate layer of polymeric material having on a surface thereof a heat-sealable layer, wherein said heat-sealable layer comprises a copolyester of least one aromatic dicarboxylic acid, at least one aliphatic dicarboxylic acid and one or more glycol(s); the thickness of said heat-sealable layer is in the range of from about 0.3 to about 3 μm; and the heat-sealable layer comprises one or more wax(es) is described.

46 Claims, No Drawings

POLYESTER FILM

This application is the National Stage filing of PCT Application No. GB2007/000527, filed 14 Feb. 2007, and claims priority benefit of GB Application No. 0603254.4, filed 17 Feb. 2006, the entirety of which is incorporated herein by reference.

FIELD OF THE INVENTION

This invention relates to a multi-layer polymeric film suitable for use as packaging for a container, particularly a container of ready-prepared ovenable meals. In particular, the invention relates to a multi-layer film which is heat-sealable to and peelable from a container.

BACKGROUND OF THE INVENTION

Plastic containers have been increasingly used in packaging applications, such as food packaging, and in particular for packaging convenience foods, for example ready-prepared ovenable meals which may be warmed either in a microwave oven or in a conventional oven or in either. A container which is suitable for use either in a microwave oven or a conventional oven is generally referred to as "dual-ovenable". Often the plastic container is an APET/CPET tray (a composite material having an amorphous polyethylene terephthalate layer on top of a crystalline polyethylene terephthalate layer). Polystyrene and polypropylene containers have also been used. The plastic container is generally used in association with a lid which seals the container in order to prevent leakage and drying out of the packaged contents during storage. In addition, the lid should not stick to the packaged contents and should be able to withstand the heat generated in the oven. Such container lids normally comprise a multi-layer film, often referred to as a "lidding film", which comprises a flexible polymeric substrate, such as biaxially oriented polyester film, and a heat-sealable coating layer.

The manufacture of sealed containers using lidding films involves the formation of a seal between the lidding film and the container. This seal is formed by placing the lid on top of the container and applying heat and pressure in order to soften or melt the sealable coating layer so that it adheres to the surface of the container and forms an effective seal between the lid and the container. The seal must be strong enough to prevent leakage of the contents. The film lid should be peelable from the container by the consumer and in such cases the seal must be strong enough to prevent leakage of the contents but not too strong to result in difficulties in removing the lid when the container is to be opened. In particular, the lid should not tear during peeling, which could result in portions of the film lid falling into the contents of the container thereby spoiling the food. A strong seal and easy-peeling properties, i.e. a clean peel, may be required at both low, e.g. ambient, and high temperatures, e.g. after heating the packaged food contents in an oven.

In addition, when disposing a food product in the container to be sealed, solids or liquids from the food product or other contaminants may come into contact with, and remain on, the top surface of the lip of the container which is to be sealed to the lidding film. This may result in poor seal properties between the container and the lid, and eventually a weak overall package. A film which performs well in this respect, i.e. which shows good seal properties despite the presence of contaminants between the lid and the container, is said to exhibit good "seal through contamination", and this is a further desirable property for these heat-sealable lidding films.

In conventional lidding films, this problem is typically addressed by increasing the thickness of the heat-seal layer, for instance, to about 25 μm or above, which is economically disadvantageous.

A further desirable sealing property is the characteristic of good "hot-tack" adhesion. This property essentially measures the speed at which a heat-seal bond is formed when a heated and softened (or molten) heat-sealable film is contacted with the surface to which it is to be sealed. Hot-tack adhesion essentially therefore corresponds to the property of heat-bond seal strength, but wherein hot-tack adhesion is measured after a much smaller time interval (typically 0.1 second) after the heat-seal bond is initiated. Heat-seal bond strength is measured once the heat-seal bond has completely formed, and normally after the heat-seal bond has cooled to ambient temperature, and can be referred to as the "cold heat-seal bond strength". Good hot-tack adhesion is important for quick, efficient and reliable packaging. In addition, in circumstances where the food to be packaged is sufficiently bulky that it protrudes above the lip of the container, the formation of a rapid heat-seal bond is desired. Typically, hot-tack adhesion is approximately proportional to the cold heat-seal bond strength, but while it is desirable to maximise hot-tack adhesion, if the hot-tack adhesion is too high then the cold heat-seal bond strength may be too strong to allow an easy and clean peel. In general, the hot-tack adhesion increases as the molecular weight of the heat-sealable polymer increases. Many thermoplastic polymers display hot-tack adhesion to some degree, albeit at different temperatures and viscosities.

In many prior art lidding films, the heat-sealable layer is applied to the substrate using either an organic solvent, or an aqueous dispersion or solution. The use of organic solvents is generally disadvantageous because they may be harmful, hazardous in use, or toxic and detrimental to the environment. In addition, films made in this way often contain a residual amount of solvent, and so may not be suitable for use in applications where they come into contact with food products. The use of organic solvents usually involves an "off-line" coating step, i.e. after any stretching and subsequent heat-setting operation employed during the manufacture of the substrate, since such solvents can cause sticking or blocking of the film during the normal winding operations used during film manufacture. The use of an aqueous dispersion or solution, such as in the process of WO-A-96/19333, avoids the use of substantial amounts of organic solvents; allows the use of a more efficient "in-line" coating process, i.e. wherein the coating layer is applied either before the film substrate is stretched or between the stretching steps of a biaxial stretching process; but is limited to coating compositions which are soluble or adequately dispersible in water. An in-line process avoids the use of the further heating or drying steps which are encountered in off-line coating processes, particularly off-line solvent-coating processes. These processes can embrittle the film and deteriorate the tensile properties. In general, an in-line coated film has therefore superior mechanical properties.

Heat-sealable films have also been manufactured by other in-line coating techniques. For instance, GB-2024715 discloses the application of a polyolefinic material onto a polyolefinic substrate using an extrusion-coating technique between the longitudinal and transverse stretching operations ("inter-draw" coating). A process for the in-line inter-draw extrusion-coating of polyolefins onto a polyester substrate to produce a heat-sealable film is disclosed in GB-1077813. U.S. Pat. No. 4,333,968 discloses a method for the inter-draw extrusion coating of an ethylene-vinyl acetate (EVA) copolymer onto a polypropylene substrate to provide a heat-sealable peelable film.

It is an object of the present invention to address one or more of the aforementioned problems and provide an improved and more economical packaging means for a ready-prepared ovenable meal. It is a further object of this invention to provide a heat-sealable and peelable film suitable for use as a packaging means for a ready-prepared ovenable meal.

SUMMARY OF THE INVENTION

According to the present invention there is provided a heat-sealable, peelable, coextruded composite polymeric film comprising a substrate layer of polymeric material having on a surface thereof a heat-sealable layer, wherein:
(i) said heat-sealable layer comprises a copolyester of at least one aromatic dicarboxylic acid, at least one aliphatic dicarboxylic acid and one or more glycol(s);
(ii) the thickness of said heat-sealable layer is in the range of from about 0.3 to about 3 μm; and
(iii) the heat-sealable layer comprises one or more wax(es).

According to a further aspect of the present invention there is provided a process for the production of a heat-sealable, peelable, composite polymeric film which comprises the steps of coextruding a polymeric substrate and a heat-sealable layer, wherein:
(i) said heat-sealable layer comprises a copolyester of at least one aromatic dicarboxylic acid, at least one aliphatic dicarboxylic acid and one or more glycol(s);
(ii) the thickness of said heat-sealable layer is in the range of from about 0.3 to about 3 μm, and
(iii) the heat-sealable layer comprises one or more wax(es).

DETAILED DESCRIPTION OF THE INVENTION

The films of the present invention exhibit a surprisingly high hot-tack adhesion strength, despite the low thickness of the heat-seal layer. It is surprising that suitable hot-tack adhesion strength can be achieved with such a low thickness of heat-seal layer. In addition, it is surprising that, when compared to films in which similar heat-sealable polymers are disposed on the substrate via a solvent-coated route, correspondingly suitable heat-seal bond strengths are achieved at a lower thickness of the heat-sealable layer.

The hot-tack adhesion of the film may be adjusted to ensure good performance of the film in use on a tray filling and lidding line. A film which shows good hot-tack on a filling line has a preferred hot-tack value, measured as described hereinbelow, of at least 3 Newtons, preferably at least 4 Newtons, but preferably no more than about 5 Newtons, and is preferably in the range of from about 3 to about 5 Newtons.

The composite film described herein is a heat-sealable, peelable film. As used herein, the term "heat-sealable peelable film" refers to a film which is capable of forming a seal to a surface under the application of heat, wherein the seal is breakable without fracture of the film. The peelable characteristic of the films described herein distinguishes them from high-seal strength or "weldable" films.

A composite film according to the present invention typically exhibits a heat-seal strength (at ambient temperature) in the range of from about 200 to about 1400 g/25 mm, preferably in the range of from about 200 to about 1000 g/25 mm, and more preferably in the range of from about 400 to about 900 g/25 mm when sealed to the APET side of a typical APET/CPET tray. Typical heat seal strengths of the film to itself are in the range of from about 200 to about 700 g/25 mm, preferably in the range of from about 400 to about 600 g/25 mm.

The shrinkage of the film, measured as described herein, is preferably less than 5%, more preferably less than 3%, and most preferably less than 2%, in the machine dimension and/or the transverse dimension. Methods of controlling shrinkage in the final film by varying process parameters during the stretching and heat-setting steps of film manufacture are well-known to the skilled person.

The respective layers of the composite film are described in more detail below.

The substrate layer is a self-supporting film or sheet by which is meant a film or sheet capable of independent existence in the absence of a supporting base. The substrate layer preferably comprises film-forming thermoplastic polymeric material. The film-forming polymeric resin is the major component of the substrate, and the polymeric resin makes up at least 50%, preferably at least 65%, preferably at least 80%, preferably at least 90%, and preferably at least 95% by weight of the total weight of the substrate. Suitable materials include a homopolymer or copolymer of a 1-olefin, such as ethylene, propylene and but-1-ene, polyamides, polycarbonates, polyesters (including copolyesters), PVC, PVA, polystyrenes, polyacrylates, celluloses and nylon (including nylon 6 and nylon 6,6). Particularly preferred is a polyester material, and particularly a synthetic linear polyester.

The synthetic linear polyesters useful for the substrate layer may be obtained by condensing one or more dicarboxylic acids or their lower alkyl diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly an aliphatic or cycloaliphatic glycol, e.g. ethylene glycol, 1,3-propanediol, 1,4-butanediol, neopentyl glycol and 1,4-cyclohexanedimethanol. Aromatic dicarboxylic acids are preferred. Aliphatic glycols are preferred. In a preferred embodiment, the substrate layer comprises polyethylene terephthalate (PET), or copolyesters in which the major repeat unit is ethylene terephthalate.

The substrate layer may contain recycle material up to a level of 50% by weight of the substrate layer, and preferably at least 10%, preferably at least 25%, and more preferably at least 40% by weight of the substrate layer. By "recycle material", we mean waste material consisting of the composite film of the present invention, and such waste material may be derived from edge-trimming (typically the edge portions of the film which are held by the stenter clips during film manufacture), from excess film left over after the film has been slit along its longitudinal dimension, from start-up film (i.e. the film produced at the start of a manufacturing run), or from film that has been failed for other reasons, as is well-known in the art. It is surprising that recycle material may be used in the substrate layer in such high proportions given that it contains the wax from the heat-sealable layer without causing problems in the film making process.

The substrate may comprise one or more discrete coextruded layers of the above film-forming materials. The polymeric materials of the respective layers may be the same or different. For instance, the substrate may comprise one, two, three, four or five or more layers and typical multi-layer structures may be of the AB, ABA, ABC, ABAB, ABABA or ABCBA type. Preferably, the substrate comprises one layer.

The heat-sealable layer is capable of forming a heat-seal bond to the surfaces of the container. The heat-sealable layer predominantly comprises copolyester material and this softens to a sufficient extent that its viscosity becomes low enough to allow adequate wetting for it to adhere to the surface to which it is being bonded. The heat-seal bond is effected by heating to soften the copolyester material of the heat-sealable layer, and applying pressure, without melting the other layers in the film. Thus, the copolyester of the heat-sealable layer should begin to soften at a temperature such that the heat-seal bond can be formed at a temperature which is less than the melting temperature of the polymeric material of the substrate. In one embodiment, the copolyester of the heat-sealable layer should begin to soften at a temperature such that the heat-seal bond can be formed at a temperature which is between about 5 and 50° C. below, preferably between about 5 and 30° C. below, and preferably at least about 10° C. below the melting temperature of the polymer material of the substrate.

The heat-sealable layer comprises a copolyester resin derived from at least one (and preferably only one) aromatic dicarboxylic acid and at least one (and preferably only one) aliphatic dicarboxylic acid (or their lower alkyl (i.e. up to 14 carbon atoms) diesters) with one or more glycol(s). Formation of the copolyester is conveniently effected in known manner by condensation, or ester-interchange, at temperatures generally up to 275° C. The copolyester resin is the major component of the heat-sealable layer, and the copolyester makes up at least 50%, preferably at least 65%, preferably at least 80%, preferably at least 90%, and preferably at least 95% by weight of the total weight of the heat-sealable layer.

Preferred aromatic dicarboxylic acids include terephthalic acid, isophthalic acid, phthalic acid, and 2,5-, 2,6- or 2,7-naphthalenedicarboxylic acid, and preferably the aromatic dicarboxylic acid is terephthalic acid.

Preferred aliphatic dicarboxylic acids are saturated aliphatic dicarboxylic acids of the general formula $C_nH_{2n}(COOH)_2$ wherein n is 2 to 8, such as succinic acid, sebacic acid, adipic acid, azelaic acid, suberic acid or pimelic acid, preferably sebacic acid, adipic acid and azelaic acid, and more preferably azelaic acid.

Preferred glycols are aliphatic or cycloaliphatic glycols, preferably an aliphatic glycol, and more preferably an alkylene glycol. Thus, suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Ethylene glycol or 1,4-butanediol is preferred.

The concentration of the aromatic dicarboxylic acid present in the copolyester is preferably no more than about 90 mole %, preferably no more than about 80 mole %, and preferably in the range from 45 to 80 mole %, more preferably 50 to 70 mole %, and particularly 55 to 65 mole % based on the dicarboxylic acid components of the copolyester. The concentration of the aliphatic dicarboxylic acid present in the copolyester is preferably at least about 10 mole %, preferably at least about 20 mole %, and preferably in the range from 20 to 55, more preferably 30 to 50, and particularly 35 to 45 mole % based on the dicarboxylic acid components of the copolyester. Particularly preferred examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acid/butylene glycol (preferably having the components in the relative molar ratios of 45-55/55-45/100, more preferably 50/50/100) having a glass transition point ($T_g$) of −40° C. and a melting point ($T_m$) of 117° C.), and a copolyester of azelaic acid/terephthalic acid/ethylene glycol (preferably having the components in the relative molar ratios of 40-50/60-50/100, more preferably 45/55/100) having a $T_g$ of −15° C. and a $T_m$ of 150° C.

Preferably, the $T_g$ of the copolyester of the heat-sealable layer is no more than about 20° C., preferably no more than about 10° C., preferably no more than about 0° C., and preferably no more than about −10° C. In one embodiment, the melting point $T_m$ of the copolyester of the heat-sealable layer is preferably no more than about 160° C., preferably no more than about 150° C., and more preferably no more than about 140° C.

The heat-sealable layer comprises one or more waxes, and typically only one type of wax. The wax may be a natural or synthetic wax, and preferably has a melting point of at least 50° C. Natural waxes are preferably either vegetable waxes (such as carnauba wax) or mineral waxes (such as montan waxes and ozocerite). Paraffin waxes (highly-refined low-molecular weight waxes comprising straight-chain hydrocarbons) may also be used.

Examples of synthetic waxes include Fischser-Tropsch waxes (produced by coal gasification, and having a molecular weight in the range from about 300 to about 1400 g/mol)), and oxidised and non-oxidised (preferably oxidised) low molecular weight polyethylene waxes (having a molecular weight in the range from about 500 to about 3000 g/mol) as well as the corresponding polypropylene waxes. However, a preferred class of waxes are amide waxes. Amidic waxes are generally immiscible with the base copolyester of the heat-sealable layer. The amide wax may be a primary, secondary, tertiary or bis (fatty) amide, such as oleamide and erucamide. Examples of the different types include primary fatty amides such as erucamide, behenamide, oleamide or stearamide; secondary fatty amides such as stearylerucamide, erucylerucamide, oleylpalmitamide, stearylstearamide or erucyistearamide; tertiary fatty amides such as dimethylstearamide or diethylstearamide; and N,N'-bis(fatty) amides such as N,N'-ethylene bis(stearamide), N,N'-methylene bis(stearamide), N,N'-propylene bis(stearamide), N,N'-ethylene bis(oleamide), N,N'-methylene bis(oleamide), or N,N'-propylene bis(oleamide). Preferably, the wax is selected from N,N'-bis(fatty) amides, and more preferably from N,N'-ethylene bis(oleamide) and N,N'-ethylene bis(stearamide). The wax assists in the manufacture by coextrusion of the composite film comprising the heat-sealable layer referred to above.

In a preferred embodiment, the wax is present at a level of from about 0.1 to about 3 wt %, preferably from about 0.5 to about 3 wt %, preferably no more than 2 wt %, and typically from about 1 to about 2 wt % of the total weight of the heat-sealable layer.

The thickness of the composite film is preferably from about 5 to 300 μm, more preferably from about 5 to 100 μm, preferably from about 5 to about 50 μm, preferably from about 10 to 30 μm, and typically from about 12 to about 25 μm in thickness. The substrate layer is significantly thicker than the heat-sealable layer. The thickness of the heat-sealable layer is from about 0.3 to about 3 μm, preferably from about 0.4 μm to about 2 μm, more preferably from about 0.5 to about 1.5 μm, more preferably from about 0.5 to about 1.0 μm, more preferably from about 0.5 to about 0.9 μm, and most preferably from about 0.5 to about 0.7 μm. Heat-sealable layers which have a thickness below about 0.3 µm, and more typically below about 0.5 µm, exhibit insufficient hot-tack and cold heat seal strength adhesion. Heat-sealable layers which have a thickness above about 3 µm, more typically above about 1.5 µm, and more typically above about 1 µm, exhibit heat-seal bond strengths which are too strong and cause tearing of the film when the film is peeled from the container to which it was heat-sealed.

The composite sheet preferably has an ultimate tensile strength (UTS) in the range of from 14 to 26 Kg/mm².

Formation of the composite is effected by conventional extrusion techniques well-known in the art, and in accordance with the procedure described below. In general terms, the extrusion process comprises the steps of extruding one or more layers of molten polymer, quenching the extrudate and orienting the quenched extrudate in at least one direction.

The film may be uniaxially-oriented, but is preferably biaxially-oriented. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastic tube which is subsequently quenched, reheated and then expanded by internal gas pressure to induce transverse orientation, and withdrawn at a rate which will induce longitudinal orientation.

In the preferred flat film process, the film-forming polymer is extruded through a slot die and rapidly quenched upon a chilled casting drum to ensure that the polymer is quenched to the amorphous state. Orientation is then effected by stretching the quenched extrudate in at least one direction at a temperature above the glass transition temperature of the substrate polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is generally effected so that the dimension of the oriented film, particularly a polyester film, is from 2 to 5 times, generally at least 2.5 times, preferably no more than 4.5 times, more preferably no more than 3.5 times its original dimension in the or each direction of stretching. Stretching in the machine direction is effected at temperatures higher than the Tg of the polymeric material of the substrate layer, typically less than 30° C. above Tg, preferably less than 20° C. above Tg and more preferably less than 15° C. above Tg of the polymeric material of the substrate layer. Stretching in the transverse direction is typically effected at temperatures in the range of 100 to 130° C. after preheating in the range of 80 to 100° C., and in any case higher than the Tg of the polymeric material of the substrate layer, typically less than 80° C. above Tg, preferably less than 60° C. above Tg and more preferably less than 50° C. above Tg of the polymeric material of the substrate layer. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the substrate polyester but below the melting temperature thereof, to induce crystallisation of the substrate polyester. Heat-setting has the effect of providing dimensional stability to a stretched film, and "locking" the film in its stretched state. The shrinkage behaviour of a film under the action of heat depends on whether, and to what extent, the film was heat-set after any stretching operation(s) effected during its manufacture. In general, a film which has experienced a temperature $T_1$ during the heat-setting operation will exhibit substantially no shrinkage below temperature $T_1$ when subsequently exposed to heat after manufacture. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film but should not be selected so as to substantially degrade the tear resistant properties of the film. Within these constraints, a heat-set temperature of about 100 to 250° C., preferably about 120 to 230° C., is generally desirable. Dimensional relaxation ("toe-in"), wherein the film is allowed to relax in a given dimension by up to about 5% and typically about 2-4% during the heat-setting step, may be used to modulate shrinkage of the film.

The composite film of the present invention comprising a substrate and a heat-sealable layer is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a multi-layer polymeric film, which may be oriented and heat-set as hereinbefore described.

One or more of the layers of the film may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, anti-blocking agents, surface active agents, slip aids, optical brighteners, gloss improvers, prodegradents, viscosity modifiers and dispersion stabilisers may be incorporated as appropriate. In particular the composite film may comprise a particulate filler which may, for example, be a particulate inorganic filler or an incompatible resin filler or a mixture of two or more such fillers. Such fillers are well-known in the art.

Particulate inorganic fillers include conventional inorganic fillers, and particularly metal or metalloid oxides, such as alumina, talc, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the polymer layer. Preferred particulate inorganic fillers include titanium dioxide and silica. The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 10 µm, more preferably 0.01 to 5 µm, more preferably 0.05 to 1.5 µm, and particularly 0.15 to 1.2 µm. Preferably at least 90%, more preferably at least 95% by volume of the inorganic filler particles are within the range of the volume distributed median particle diameter ±0.8 µm, and particularly ±0.5 µm. Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

In a preferred embodiment, the heat-sealable layer comprises at least about 0.5%, and no more than about 5% by weight (based on the total weight of the layer), preferably no more than about 2% by weight, and preferably no more than about 1.5% weight, of inorganic filler particles. The filler particles are selected from the filler particles referred to hereinabove, and are preferably selected from silica and talc, preferably silica. In this embodiment, the windability of the film (i.e. the absence of blocking or sticking when the film is would up into a roll) is improved, without an unacceptable reduction in haze or other optical properties. It has surprisingly been found that filler added at a level of from about 0.5 to about 5% by weight provides advantages in terms of the peelability of the film, in that if the upper thresholds of filler as described herein are exceeded, then the film is susceptible to tearing when peeled from the container to which it has been heat-sealed. While the inventors do not intend to be bound by theory, it is believed that the filler particles are very tightly bound to the copolyester used for the heat-sealable layer in the present invention, and that these filler particles are acting as tear-initiation points. It is believed that when the film undergoes a peel, a sufficiently high concentration of filler particles causes the local stress in the polymeric matrix to exceed a critical level and, instead of delamination, the filler adheres to the copolyester, causing a tear.

The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

In one embodiment, the film of the present invention is optically clear, preferably having a % of scattered visible light (haze) of <10%, preferably <8%, and particularly <6%, measured according to the standard ASTM D 1003.

In an alternative embodiment, the film is opaque and highly filled, preferably exhibiting a Transmission Optical Density (TOD) (Sakura Densitometer; type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. The film is conveniently rendered opaque by incorporation into the polymer blend of an effective amount of an opacifying agent. Suitable opacifying agents include an incompatible resin filler, a particulate inorganic filler or a mixture of two or more such fillers, as hereinbefore described. The amount of filler present in a given layer is preferably in the range from 1% to 30%, more preferably 3% to 20%, particularly 4% to 15%, and especially 5% to 10% by weight, based on the weight of the layer polymer. The surface of an opaque film preferably exhibits a whiteness index, measured as herein described, in the range from 60 to 120, more preferably 80 to 110, particularly 90 to 105, and especially 95 to 100 units.

The surface of the substrate in contact with the heat sealable layer is referred to herein as the primary side. The surface of the substrate opposite to the surface which is in contact with the heat-sealable layer is referred to herein as the secondary side. The secondary side of the substrate may have thereon one or more further polymeric layers or coating materials. Any coating of the secondary side is preferably performed "in-line". The composite film of the invention is intended to be manufactured, stored, sold and used without any additional layers on the exposed surface of the heat-sealable layer.

In one embodiment, the additional coating on the secondary side may comprise a "slip coating" in order to improve the handling and windability of the film, particularly when the film substrate is a PET polyester substrate. A suitable slip coating may be, for instance a discontinuous layer of an acrylic and/or methacrylic polymeric resin optionally further comprise a cross-linking agent, such as described in EP-A-0408197, the disclosure of which is incorporated herein by reference. An alternative slip coating may comprise a potassium silicate coating, for instance as disclosed in U.S. Pat. Nos. 5,925,428 and 5,882,798, the disclosures of which are incorporated herein by reference.

In a further embodiment, the secondary side of the substrate has disposed thereon a printable or ink-receiving layer, and optionally a primer layer (such as that disclosed in EP-0680409, EP-0429179, EP-0408197, EP-0576179 or WO-97/37849, the disclosures of which are incorporated herein by reference) between the substrate and the printable or ink-receiving layer in order to increase adhesion. Suitable printable or ink-receiving layers are disclosed in, for instance, EP-0696516, U.S. Pat. No. 5,888,635, U.S. Pat. No. 5,663,030, EP-0289162, EP-0349141, EP-0111819 and EP-0680409, the disclosures of which are incorporated herein by reference. A preferred ink-receiving layer comprises an acrylic and/or methacrylic polymeric resin, as disclosed in EP-A-0408197. A preferred receiving layer polymer comprises alkyl acrylate monomer units and alkyl methacrylate monomer units, preferably ethyl acrylate and alkyl methacrylate (preferably methyl methacrylate). In a preferred embodiment, the alkyl acrylate monomer units are present in a proportion from about 30 to about 65 mole % and the alkyl methacrylate monomer units are present in a proportion from about 20 to about 60 mole %. In a particularly preferred embodiment, the polymer comprises about 35 to 60 mole % ethyl acrylate, about 30 to 55 mole % methyl methacrylate and about 2 to 20 mole % methacrylamide. Such polymers are preferably applied to the substrate as an aqueous dispersion or alternatively as a solution in organic solvent. The polymer composition may be applied to an already oriented film substrate. However, application is preferably effected before or during the stretching operation(s). Where the substrate is biaxially oriented, the ink-receiving layer is preferably applied between the two stages (longitudinal and transverse) of the biaxial stretching operation.

In one embodiment, the composite film consists of a substrate and a heat-sealable layer, as defined herein, that is to say that the no other layers are present in the film. In an alternative embodiment, the composite film consists of a substrate, a heat-sealable layer, and on the secondary surface of the substrate a printable or ink-receiving layer, and optionally an adhesion-promoting primer layer between the substrate and the printable or ink-receiving layer.

The composite film of the present invention is particularly intended for use in association with a container or receptacle for a food product, particularly ready prepared convenience foods which may be warmed in an oven, particularly a microwave oven. However, the invention is also applicable for ready-prepared meals which are intended to be warmed in any other type of oven, such as a conventional convection oven, a direct radiation oven and a forced hot air oven.

The container may be, for instance, a thermoformed tray, thermoformed bowl or blow-moulded bottle. The container may be formed of polyester, such as polyethylene terephthalate, or of polypropylene, polystyrene, or may be PVDC coated, or may be glass. The invention is particularly suitable for use with an APET/CPET container, especially a thermoformed tray, which is suitable for packaging food or drink. Other suitable types of container include a metallised tray and a tray formed from PET-coated cartonboard or paperboard. Of particular utility are trays formed from metallised (particularly flash-metallised) PET cartonboard. For example, the tray may be produced from PET which has been metallised to an optical density in the range of about 0.01 to 4.0 and which is laminated to cartonboard. In one embodiment, the tray is a susceptor tray made from materials such as those disclosed in GB-A-2280342, EP-A-0563442 or GB-A-2250408, or is a susceptor tray produced in accordance with the disclosures of these documents, which are incorporated herein by reference.

According to a further aspect of the invention, there is provided the use of the composite film described herein as, or in the manufacture of, a lidding film suitable for heat-sealing to a receptacle containing a food product, particularly a ready-prepared ovenable meal.

The invention further provides a sealed container comprising a receptacle containing a food product, particularly an ovenable meal, and a lid formed from a composite film as defined herein. The sealed container is produced by techniques well-known to those skilled in the art. Once the food to be packaged has been introduced into the receptacle, the heat-sealable film lid is affixed using temperature and/or pressure using conventional techniques and equipment.

The invention further provides a packaged food product, particularly an ovenable meal, wherein the packaging comprises a film as defined herein.

The following test methods may be used to determine certain properties of the polymeric film:
(i) Wide angle haze is measured using a Hazegard System XL-211, according to ASTM D 1003-61.
(ii) Whiteness index is measured using a Colorgard System 2000, Model/45 (manufactured by Pacific Scientific) based on the principles described in ASTM D313.
(iii) Heat-seal strength is measured as follows. The film is sealed, by means of the heat-sealable layer, to a typical APET/CPET tray (obtained from Faerch A/S, Denmark) using a Microseal PA 201 (obtained from Packaging Automation Ltd, England) tray sealer at a temperature of 180° C., and pressure of 80 psi for two seconds. Strips (25 mm wide) of the sealed film and tray are cut out at 90° to the seal, and the load required to pull the seal apart measured using an Instron operating at a crosshead speed of 0.25 mmin$^{-1}$. The procedure is generally repeated 4 times, and a mean value of 5 results calculated.
(iv) Heat-seal strength of the composite film to itself to itself is measured by positioning together and heating the heat-sealable layers of two samples of the film at 160° C. for 0.5 second under a pressure of 80 psi. The sealed film is cooled to room temperature, and the sealed composite cut into 25 mm wide strips. The heat-seal strength is determined by measuring the force required under linear tension per unit width of seal to peel the layers of the film apart at a constant speed of 0.25 mmin$^{-1}$.
(v) Hot-tack adhesion is measured according to ASTM F1921-98 ("Standard test methods for the hot seal strength (hot tack) of thermoplastics polymers and blends comprising the sealing surface of flexible webs") using a Davinor J&B hot tack tester. Strips of the composite film (25 mm wide) are sealed in the machine to an APET/CPET surface (obtained from Faerch A/S, Denmark) at defined conditions of seal temperature and force and the resulting seal strength is measured at a given peel speed at defined times after the seal has been made. In this work, the seal temperature was 150° C.; the seal pressure was 1N/mm$^2$; the seal time was 0.5 seconds; the cool time (i.e. the time between making the seal and performing the seal strength measurement) was 0.1 seconds; and the peel speed was 120 mm/s.
(vi) Shrinkage is measured by placing the sample in an oven at a temperature of 190° C. for 5 minutes. The shrinkage behaviour is assessed using 5 film samples.
(vii) Ultimate tensile strength is measured according to ASTM D882-88, taking the average of the values in the longitudinal and transverse dimensions of the film.

The invention is further illustrated by the following examples. It will be appreciated that the examples are for illustrative purposes only and are not intended to limit the invention as described above. Modification of detail may be made without departing from the scope of the invention.

EXAMPLES

Example 1

A composite film was manufactured by coextrusion in which the first (substrate) layer was unfilled polyethylene terephthalate (PET), and the second layer was a heat-sealable copolyester of azelaic acid/terephthalic acid/ethylene glycol (45/55/100) having a $T_g$ of −15° C. and a $T_m$ of 150° C. The heat-sealable layer further comprised 1.5% by weight (relative to the total composition of the layer) of an N,N'-ethylene bis(oleamide) wax (EBO; obtained as Crodamide EBO from Croda), and 3% by weight (relative to the total composition of the layer) of silica filler particles with an average particle size of 1 μm.

The copolyesters were coextuded using separate streams supplied from separate extruders, to a single channel coextrusion assembly. The polymer layers were extruded through a film-forming die on to a water-cooled rotating, quenching drum at various line speeds to yield an amorphous cast composite extrudate. The cast extrudate was heated to a temperature in the range of about 50 to 80° C. and then stretched longitudinally at a forward draw ratio of about 3:1. The polymeric film was passed into a stenter oven at a temperature of about 110° C., where the sheet was stretched in the sideways direction to approximately 4 times its original dimensions, and then heat-set at temperatures between 210 and 225° C. The final thickness of the film was 25 μm, in which the second (heat-sealable) layer was 0.65 μm in thickness. The film was clear with a haze of 6%. The hot-tack adhesion of the film was 5 Newtons. The heat-seal strength of the film to itself was 500 g/25 mm. The film exhibited an easy and clean manual peel from the tray.

Comparative Example 1

Example 1 was repeated except that no wax was added. The film stuck to the casting drum, making manufacture impossible.

Comparative Example 2

Example 1 was repeated except that the heat-sealable layer comprised 6% filler. The film was susceptible to tearing when peeled from the tray.

Comparative Example 3

Example 1 was repeated except that the heat-sealable layer was 3.5 μm thick, and exhibited high hot tack and a high cold peel strength, and was susceptible to tearing when peeled from the tray.

Comparative Example 4

Example 1 was repeated except that the heat-sealable layer was 0.2 μm thick, and exhibited an insufficiently low cold peel strength.

The invention claimed is:

1. A heat-sealable, peelable, coextruded composite polymeric film comprising a substrate layer of polymeric material having on a surface thereof a heat-sealable layer, wherein:
   (i) said heat-sealable layer comprises a copolyester of at least one aromatic dicarboxylic acid, at least one aliphatic dicarboxylic acid and one or more glycol(s) and the copolyester makes up at least 90% by weight of the total weight of the heat sealable layer;
   (ii) the thickness of said heat-sealable layer is in the range of from about 0.3 to about 3 μm;
   (iii) the heat-sealable layer comprises one or more wax(es); and
      wherein the glass transition point (Tg) of the copolyester of the heat-sealable layer is no more than about 20° C.

2. The film according to claim 1 wherein the substrate comprises polyester.

3. The film according to claim 1 wherein the substrate comprises poly(ethylene terephthalate).

4. The film according to claim 1 wherein the aromatic dicarboxylic acid is terephthalic acid.

5. The film according to claim 1 wherein the glycol is ethylene glycol.

6. The film according to claim 1 wherein the copolyester is a copolyester of azelaic acid and terephthalic acid with ethylene glycol; wherein the relative molar ratios of azelaic acid/terephthalic acid/ethylene glycol are in the range 40-50/60-50/100.

7. The film according to claim 1 wherein the total thickness of the film is in the range of from about 5 to about 50 μm.

8. The film according to claim 1 wherein the thickness of the heat-sealable layer is in the range of from about 0.5 to about 0.9 μm.

9. The film according to claim 1 wherein shrinkage of the film at 190° C. for 5 minutes is less than 5%.

10. The film according to claim 1 which is biaxially oriented.

11. The film according to claim 1 wherein said wax is an amide wax.

12. The film according to claim 1 wherein said wax is selected from N,N'-ethylene bis(oleamide) and N,N'-ethylene bis(stearamide).

13. A method of packaging a food product, comprising heat-sealing a film according to claim 1 to a receptacle containing a food product.

14. A sealed container comprising a receptacle containing a food product, said container further comprising a lid formed from a composite film as defined in claim 1.

15. A packaged food product wherein the packaging comprises a film as defined in claim 1.

16. The film according to claim 1 wherein the aliphatic dicarboxylic acid is a saturated aliphatic dicarboxylic acid of formula $C_nH_{2n}(COOH)_2$ wherein n is 2 to 8.

17. The film according to claim 16 wherein said aliphatic dicarboxylic acid is selected from the group consisting of sebacic acid, adipic acid and azelaic acid.

18. The film according to claim 1 wherein the aromatic dicarboxylic acid is present in the heat-sealable copolyester in the range from 45 to 80 mole % based on the dicarboxylic acid components of the copolyester.

19. The film according to claim 18 wherein said aromatic dicarboxylic acid is present in the copolyester in the range from 55 to 65 mole % based on the dicarboxylic acid components of the copolyester.

20. The film according to claim 1 wherein the aliphatic dicarboxylic acid is present in the heat-sealable copolyester in the range from 20 to 55 mole % based on the dicarboxylic acid components of the copolyester.

21. The film according to claim 20 wherein the aliphatic dicarboxylic acid is present in the heat-sealable copolyester in the range from 35 to 45 mole % based on the dicarboxylic acid components of the copolyester.

22. A heat-sealable, peelable, coextruded composite polymeric film comprising a substrate layer of polymeric material having on a surface thereof a heat-sealable layer, wherein:
   (i) said heat-sealable layer comprises a copolyester of azelaic acid and terephthalic acid with ethylene glycol; wherein the relative molar ratios of azelaic acid/terephthalic acid/ethylene glycol are in the range 40-50/60-50/100 and the copolyester makes up at least 90% by weight of the total weight of the heat sealable layer;
   (ii) the thickness of said heat-sealable layer is in the range of from about 0.3 to about 3 μm; and
   (iii) the heat-sealable layer comprises one or more waxes.

23. The film according to claim 22 wherein the substrate comprises polyester.

24. The film according to claim 22 wherein the substrate comprises poly(ethyleneterephthalate).

25. The film according to claim 22 wherein the total thickness of the film is in the range of from about 5 to about 50 μm.

26. The film according to claim 22 wherein the thickness of the heat-sealable layer is in the range of from about 0.5 to about 0.9 μm.

27. The film according to claim 22 wherein shrinkage of the film at 190° C. for 5 minutes is less than 5%.

28. The film according to claim 22 which is biaxially oriented.

29. The film according to claim 22 wherein said wax is an amide wax.

30. The film according to claim 22 wherein said wax is selected from N,N'-ethylene bis(oleamide) and N,N'-ethylene bis(stearamide).

31. A method of packaging a food product, comprising heat-sealing a film according to claim 22 to a receptacle containing a food product.

32. A sealed container comprising a receptacle containing a food product, said container further comprising a lid formed from a composite film as defined in claim 22.

33. A packaged food product wherein the packaging comprises a film as defined in claim 22.

34. A heat-sealable, peelable, co-extruded composite polymeric film comprising a substrate layer of polymeric material having on a surface thereof a heat-sealable layer, wherein:
   (i) said heat-sealable layer comprises a copolyester of adipic acid and terephthalic acid with an aliphatic glycol; wherein the relative molar ratios of adipic acid/terephthalic acid/aliphatic glycol are in the range 30-50/70-50/100 and the copolyester makes up at least 90% by weight of the total weight of the heat sealable layer;
   (ii) the thickness of said heat-sealable layer is in the range of from about 0.3 to about 3 μm; and
   (iii) the heat-sealable layer comprises one or more waxes.

35. The film according to claim 34 wherein the substrate comprises polyester.

36. The film according to claim 34 wherein the substrate comprises poly(ethyleneterephthalate).

37. The film according to claim 34 wherein the total thickness of the film is in the range of from about 5 to about 50 μm.

38. The film according to claim 34 wherein the thickness of the heat-sealable layer is in the range of from about 0.5 to about 0.9 μm.

39. The film according to claim 34 wherein shrinkage of the film at 190° C. for 5 minutes is less than 5%.

40. The film according to claim 34 which is biaxially oriented.

41. The film according to claim 34 wherein said wax is an amide wax.

42. The film according to claim 34 wherein said wax is selected from N,N'-ethylene bis(oleamide) and N,N'-ethylene bis(stearamide).

43. A method of packaging a food product, comprising heat-sealing a film according to claim 34 to a receptacle containing a food product.

44. A sealed container comprising a receptacle containing a food product, said container further comprising a lid formed from a composite film as defined in claim 34.

45. A packaged food product wherein the packaging comprises a film as defined in claim 34.

46. A process for the production of a heat-sealable, peelable, composite polymeric film which comprises the steps of coextruding a polymeric substrate and a heat-sealable layer, wherein:
   (i) said heat-sealable layer comprises a copolyester of at least one aromatic dicarboxylic acid, at least one aliphatic dicarboxylic acid and one or more glycol(s) and the copolyester makes up at least 90% by weight of the total weight of the heat sealable layer;
   (ii) the thickness of said heat-sealable layer is in the range of from about 0.3 to about 3 μm;
   (iii) the heat-sealable layer comprises one or more wax(es); and
   wherein the glass transition point (Tg) of the copolyester of the heat-sealable layer is no more than about 20° C.

* * * * *